J. BISHOP.
Driving-Gear for Street-Cars.

No. 200,499. Patented Feb. 19, 1878.

Witnesses
John K. Rupertus.
Harry Smith.

Joshua Bishop
by his Attorneys
Howson and Son

UNITED STATES PATENT OFFICE.

JOSHUA BISHOP, OF PHILADELPHIA, PENNSYLVANIA, ASSIGNOR OF ONE-HALF HIS RIGHT TO JAMES FORNEY, OF SAME PLACE.

IMPROVEMENT IN DRIVING-GEAR FOR STREET-CARS.

Specification forming part of Letters Patent No. 200,499, dated February 19, 1878; application filed December 29, 1876.

*To all whom it may concern:*

Be it known that I, JOSHUA BISHOP, of Philadelphia, Pennsylvania, have invented a new and useful Improvement in Propelling Devices for Street-Cars, of which the following is a specification:

My invention relates to that class of street-cars in which the axles are driven from an engine through the medium of suitable mechanism, which is carried by the axles; and the object of my invention is to so construct the frame carrying the said mechanism as to strengthen the frame and protect the gear-wheels from dirt and dust.

Figure 1:
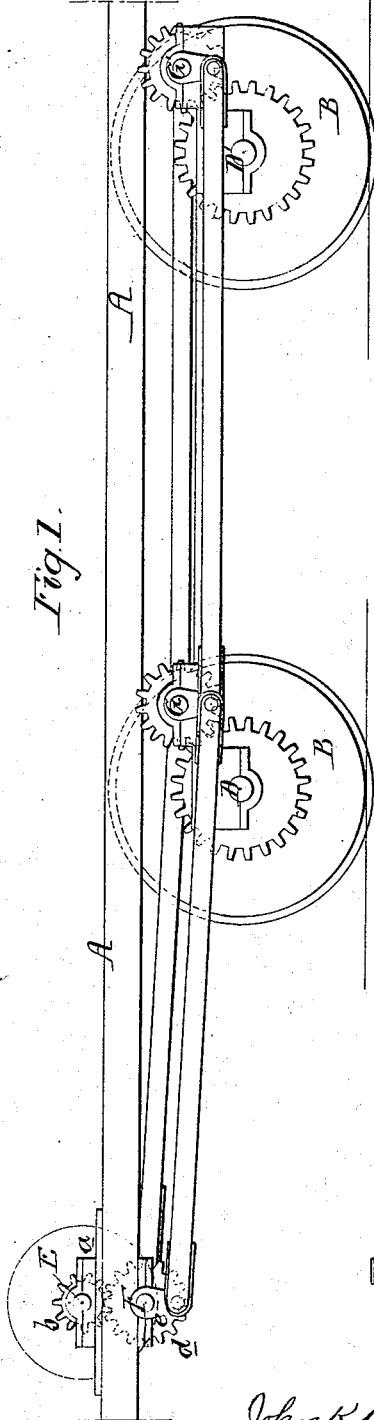
Figure 2:
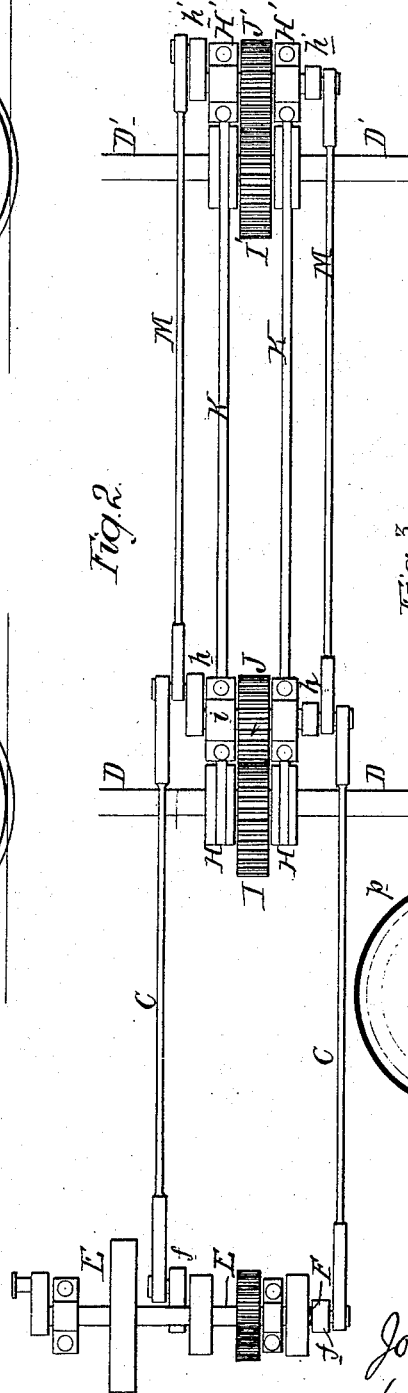
Figure 3:
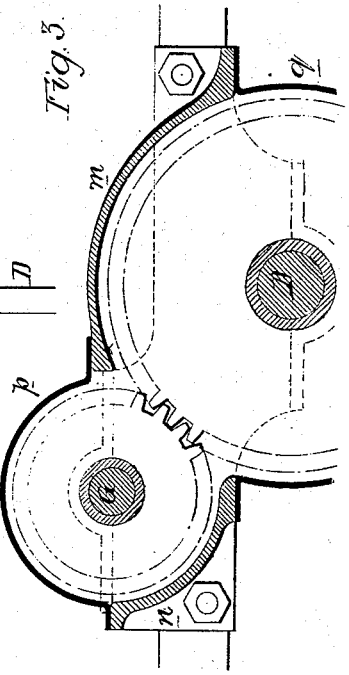

In the accompanying drawing, Figure 1 is a side view of the driving-gear for street-cars to which my invention is to be applied; Fig. 2, a plan view of the same, and Fig. 3 an enlarged sectional view of my improvement.

I will first describe the construction of the mechanism to which my invention is specially applicable.

A represents the frame of the car, which is provided with the usual flanged wheels B, secured to the axles D D', the latter having their bearings in boxes adapted to hangers on the frames in the ordinary manner.

On the frame of the car, near one end of the same, are suitable bearings $a$ for the shaft E, to be driven by an engine placed on the platform of the car, and on this shaft is a pinion, $b$, gearing into a wheel, $d$, on a shaft, F, adapted to bearings $e$ on the frame. On the shaft F are two cranks, $f\,f$, arranged at right angles to each other, and coupled by rods $c\,c$ to like cranks $h\,h$ on a shaft, G, the latter turning in bearings $i\,i$ on the two frames H H, which are carried by, and in which turns, the axle D, having a cog-wheel, I, into which gears a pinion, J, on the shaft G. The rear axle D' carries a system of gearing precisely similar to that described, the frames H' H' of this axle being connected to the frames H H of the front axle by bars K or other appropriate connecting mediums. The frames H' H' of the rear axle carry the shaft G', which has a pinion, J', gearing into a wheel, I', on the said axle, and the cranks $h'\,h'$ of this shaft G' are coupled by rods M M to the cranks $h\,h$ of the shaft G.

It will be seen that the frames H H H' H' and bars K K constitute a frame-work which is supported solely by the two axles of the car, and that any vertical movement of the axle-boxes in the hangers, and consequently of the axles themselves, will be communicated to the said frame-work, so that the pinions of the shafts G G' will always remain in proper gear with their respective wheels.

I connect the frames H H together by the two segments $m$ and $n$, (shown in the enlarged view, Fig. 3,) which, together with shields $p$ and $q$ of sheet-iron, inclose the pinion J and wheel I; or the two frames may be cast in one piece with the segments, the shields being removable. The frames H H are thus strengthened and the pinions protected from dust and dirt. A similar arrangement may be adopted for the gearing of the rear axle.

I claim as my invention—

1. The combination of the frames H H, having bearings for the axles and for the shaft geared to the axle, with the segments $m\,n$, connecting the said frames, as set forth.

2. The combination of the frames H H, having bearings for the axle and for the shaft geared to the axle, with the segments $m\,n$ and shields $p\,q$, as described.

In testimony whereof I have signed my name to this specification in the presence of two subscribing witnesses.

JOSHUA BISHOP.

Witnesses:
HERMANN MOESSNER,
HARRY SMITH.